June 23, 1964  C. M. DE WOODY  3,138,413
SELF-ACTING BEARING ASSEMBLY
Filed March 26, 1962

INVENTOR
C. M. DEWOODY
BY
ATTORNEY

United States Patent Office 3,138,413
Patented June 23, 1964

3,138,413
SELF-ACTING BEARING ASSEMBLY
Charles M. De Woody, Vineland, N.J., assignor to Ace Glass Incorporated, Vineland, N.J., a corporation of New Jersey
Filed Mar. 26, 1962, Ser. No. 182,481
8 Claims. (Cl. 308—121)

This invention relates to bearings of the type wherein the shaft and bearing members are formed of glass or other ceramic material, and consists more particularly in new and useful improvements in a "self-acting" bearing employing a cushion of air or gas as the lubricant.

In bearing assemblies of this type, the shafts and bearings are not in direct contact, their surfaces being completely separated by a film of gas, usually air, and therefore, under proper conditions, they require no oil or other lubricant. In these "self-acting" bearing assemblies, rotation of the surface of the shaft creates a gas film pressure within the clearance space of the bearing, causing separation of the surfaces and establishing load carrying capacity. As this load carrying capacity varies with speed, in the past a problem has been presented when the bearing was started up or run at very low speeds, because of excessive wear, galling and seizure.

It is an object of the present invention to provide a "self-acting" bearing assembly designed to overcome the difficulties encountered when the bearing is started up or running at low speeds.

Also, in conventional shaft and bearing assemblies, precautions must be taken to minimize differential expansion of the shaft and bearing because the resulting change in mean clearance will affect the bearing performance. Changes in temperature of the lubricating gas per se, is minor in importance since the viscosity increases with temperature and is favorable for higher temperature operation. Operating temperature changes, however, cause an increase in clearance which may be difficult or impossible to compensate by the usual methods such as cooling the journal.

It is therefore an object of the present invention to apply a thin coating of self-lubricating plastic to the shaft which has a greater coefficient of expansion than the shaft, to compensate for the dimensional difference in clearance, up to the temperature at which compressive force is removed from the coating.

In the use of full journal bearings, there arises at a certain speed, an operating difficulty known as "half-speed film whirl" which is usually caused when the shaft center rotates about a point near the bearing center at approximately half the shaft speed.

In conventional "self-acting" bearings, this orbital speed coincides with the average velocity of the gas at the lifting wedge, normally produced between the moving and fixed surfaces of the bearing, and nullifies the lifting action so that the shaft continues to maintain contact with the bearing, causing destructive results which are eliminated by the present invention.

A further object of the present invention, therefore, is to provide a bearing assembly wherein the shaft coating serves as a protection from this damage for a considerable time, at least long enough to save the bearing.

In bearing assemblies of this type, a film whirl or wiping action caused by dynamic load unbalance, varies with the frequency of wiping rotation, and shaft speed. At a critical speed, the wiping action occurs at the same speed as the mean angular velocity of the gaseous lubricant molecules. The gas film thickness at the wiping surface approaches a monomolecular layer and the film strength is insufficient to resist penetration by a point source, thus permitting galling and subsequent seizure.

In the present invention, this difficulty is overcome by creating a roughened or irregular surface on the shaft which in combination with a smooth surface on the bearing, provides both pockets and turbulence which increases the critical wiping frequency and raises the permissible bearing speed.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Briefly, in the practice of the invention, the bearing shaft comprises a smooth glass rod which is first ground by conventional grinding methods to establish a uniform roundness of contour. The ground rod is then processed to produce a random defacing of its periphery from end to end to produce intermittent irregularities to a depth not exceeding .002 inch, while still maintaining a maximum diameter not less than .0005 inch from the original diameter of the glass rod after the first grinding step. As will later appear, these irregularities serve to produce the necessary turbulence to maintain a lubricating gas film cushion between the shaft and bearing.

Following the random defacing of the periphery of the glass rod, a thin film of lubricating plastic such as Teflon, nylon, Kel–F or a chlorinated polyether, which may also contain protected particles of metal oxides or sulphides, graphite and mica or other minerals, is sprayed on the periphery of the shaft as a dispersion. For example, a rod coated with a Teflon dispersion to be fused is then subjected to a first baking temperature of from 240° to 250° C. for from ¾ of an hour to an hour, followed by a final baking at temperatures between 225° and 240° C. for eight hours to harden the coating. Preferably, the thickness of this cured film is of the order of .0005 inch and not greater than .001 inch.

The contour of the sprayed coating substantially follows that of the defaced periphery of the rod, thus maintaining the irregularities for producing the necessary turbulence and maintaining the lubricant film cushion.

In some instances, such, for example, as with use of Kel–F, it may not be considered necessary to deface the periphery of the shaft where a satisfactory performance may be obtained by simply applying the plastic coating to this periphery. In these instances, the rod is sprayed with the plastic coating prior to grinding, the coating being preferably of an initial thickness of .003 inch. After having been baked at a fusing temperature, depending upon the nature of the plastic employed, the coated shaft is ground back to a thickness of .0015 inch, producing the necessary irregularities in the surface of the plastic coating.

The accompanying drawings represent an exaggerated showing of the various steps followed in preparing the bearing shaft and also illustrate the final bearing assembly.

A rod 10 of the desired length and diameter is selected for preparation of the bearing shaft. This rod is formed of a glass or ceramic material having a low coefficient of expansion, preferably a borosilicate glass or a high silica glass such as that known as Vycor, because of its thermal shock resistance. The rod 10 is first ground by conventional grinding methods to provide a peripheral surface 11 of uniform roundness of contour.

Figure 6:
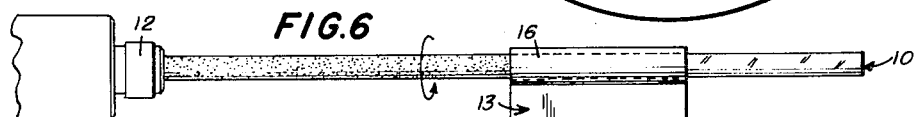
FIGURE 6 is a view diagrammatically illustrating the rod defacing step.
Figure 7:
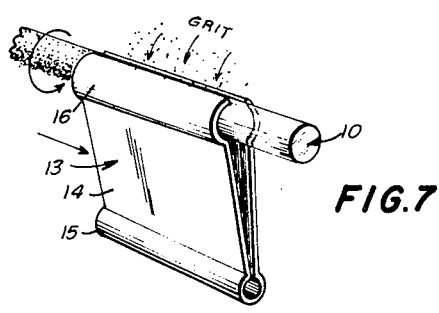
FIGURE 7 illustrates one form of peripheral defacing implement.

While the peripheral defacing of the ground rod for producing intermittent irregularities may be accomplished by other methods, the one diagrammatically illustrated in FIGURES 6 and 7 has proven satisfactory. Here it will be seen that the rod 10 is placed in a suitable chuck 12 and as the rod is rotated by the chuck, a manually operated defacing implement 13 is caused to frictionally engage the periphery of the rod while being reciprocated from end to end thereon. As best seen in FIGURE 7, this implement 13 comprises two metal wings 14 joined at one end by a resilient hinge-like bead 15, the free ends of each wing terminating in oppositely disposed channels 16 adapted to receive therebetween, the periphery of the rod 10. The resilience of the hinge 15 normally tends to separate the opposed channels 16 for receiving the rod 10 and manual pressure on the wings 14 when the implement is held in the hands of the operator, and causes the channels 16 to embrace the periphery of the rod as the implement is reciprocated thereon.

Figure 1:
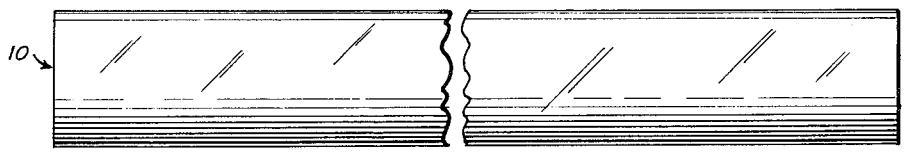
FIGURE 1 is a plan view partly broken away, showing the smooth glass rod used in forming the bearing shaft of the present invention.
Figure 2:
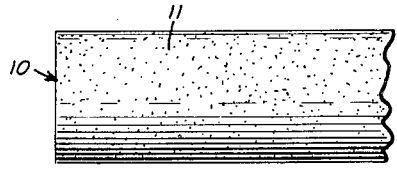
FIGURE 2 is a fragmentary plan view showing a portion of the rod after being ground.
Figure 3:
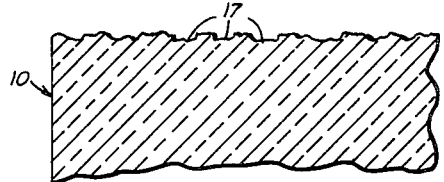
FIGURE 3 is an enlarged fragmentary sectional view representing an exaggerated showing of the peripheral irregularities in the rod following the defacing step.

In the course of this reciprocation of the implement 13, a suitable quantity of grit of proper size, such as Carborundum, preferably 90 grit, is sprinkled on the periphery of the rod between the channels 16 and it has been found that by reciprocating the implement approximately four times from end to end of the rod, a series of intermittent irregularities 17 are produced, while still maintaining the desired maximum diameter of the rod. These irregularities 17 are shown in greatly exaggerated form in FIGURE 3.

Figure 4:
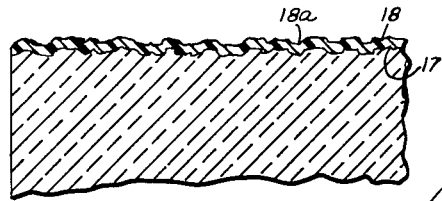
FIGURE 4 is a view similar to FIGURE 3, showing the defaced rod after the application of a plastic coating to its periphery.

The randomly defaced rod 10 is then coated with a thin film of lubricating plastic 18 which is preferably sprayed on the periphery of the rod as a dispersion, as before explained. This plastic coating is distributed over the periphery, tending to round out any corners or points which may have remained in the formation of the irregularities 17, while substantially conforming to the irregularities in the peripheral contour of the rod. Thus, overlying each of the irregularities 17 in the periphery of the rod, there appears a corresponding irregularity 18a in the outer surface of the coating 18 as seen in FIGURE 4.

Figure 5:
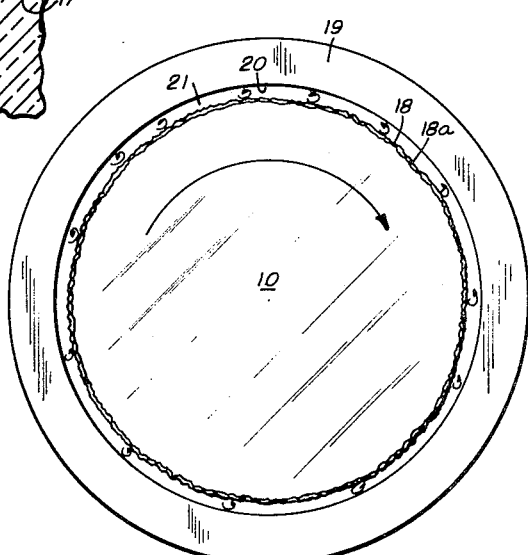
FIGURE 5 is an enlarged end view of the completed shaft in its bearing.

The coated shaft 10 is assembled in a bearing member 19 having a smooth inner periphery or bearing surface 20, the diameter of the shaft 10 being such as to afford a fit clearance of 0.001 inch or less, shown greatly exaggerated at 21 in FIGURE 5. Thus, during the rotation of the shaft 10 in the bearing 19, a lubricating cushion of gas or air surrounds the shaft 10 within this clearance space, causing a separation of the adjacent surfaces of the shaft and bearing and eliminating the need of a conventional lubricant.

During acceleration and deceleration, the irregularities 18a in the periphery of the coating 18, in combination with the smooth surface 20 of the bearing 19, provide both pockets and turbulence, which facilitates the maintenance of the air cushion, thereby suspending the shaft 10 within the bearing, but without direct contact between the two surfaces.

As before stated, the load carrying capacity of a self-acting bearing assembly of this type varies with speed, and when the bearing is started up or at very low speeds, excessive wear, galling and seizure would normally occur. However, by the use of the coating 18 of a lubricating plastic according to the present invention, this difficulty is overcome; intermittent contact at high speeds can be tolerated, and shaft unbalance can be increased considerably.

The advantages of this improved self-acting bearing over fluid lubricated bearings are extremely low friction and low power requirements; no solid-to-solid contact in normal operation, and, hence, no continuous wear; gases may be used which are stable at temperatures from minus 450° to at least 300° F. and which do not undergo changes in phase or composition. Obviously, this temperature change is impossible for single fluid lubricated bearings. There are no external fluid circulation requirements, and as a result of the low friction and low power requirements and stability of the gases, sustained high speed operation is possible up to at least 100,000 r.p.m.

While the use of air bearings has generally been restricted to low load devices such as fans, hermetically sealed pumps for liquid metals, and organic materials used in nuclear applications, the bearing assembly of the present invention makes possible many uses of glass bearings, both in laboratory and industry.

It may also be noted that instead of the reciprocating method of defacing the periphery of the rod, I may employ a centerless grinding method wherein the rod is reversed end for end in a through-feed operation.

From the foregoing, it is believed that my invention may be readily understood by those skilled in the art without further description, it being borne in mind that numerous changes may be made in the details disclosed without departing from the spirit of the invention as set forth in the following claims.

I claim:

1. A self-acting bearing assembly, comprising a shaft and a bearing member having an annular clearance to accommodate a gas film cushion, the peripheral surface of said shaft being provided with a series of minute irregularities distributed throughout, a thin coating of plastic material on the periphery of said shaft, the external surface thereof conforming substantially to the irregular surface contour of said shaft, and the adajcent, spaced bearing surface of said bearing member being substantially smooth, whereby, upon rotation of said shaft in said bearing, a turbulent gas film is caused to act as a lubricating medium.

2. A self-acting bearing assembly comprising a shaft and a bearing having an annular clearance to accommodate a gas film cushion, the peripheral surface of said shaft being provided with randomly distributed irregularities throughout, a thin coating of plastic material on the periphery of said shaft, the external surface thereof conforming substantially to the irregular surface contour of said shaft, and the adjacent, spaced bearing surface of said bearing being substantially smooth, whereby, upon rotation of said shaft in said bearing, a turbulent gas film is caused to act as a lubricating medium.

3. A self-acting bearing assembly, comprising a glass shaft and a glass bearing having an annular clearance to accommodate a gas film cushion, the peripheral surface of said shaft being provided with a series of randomly distributed irregularities throughout, a thin coating of plastic material on the periphery of said shaft, the external surface thereof conforming substantially to the irregular surface contour of said shaft, and the adjacent, spaced bearing surface of said bearing being substantially smooth, whereby, upon rotation of said shaft in said bearing, a turbulent gas film is caused to act as a lubricating medium.

4. A bearing assembly as claimed in claim 3, wherein said shaft is formed of a ceramic material having a low coefficient of expansion to afford thermal shock resistance.

5. A self-acting bearing as claimed in claim 3, wherein said shaft coating is formed of a lubricating plastic.

6. A bearing assembly as claimed in claim 3, wherein said shaft coating is formed of a lubricating plastic having a thickness of the order of .0005 inch.

7. A self-acting bearing assembly, comprising a shaft and a bearing member having an annular clearance to accommodate a gas film cushion, the peripheral surface of said shaft being provided with a series of intermittent irregularities to a depth not exceeding .002 inch, distributed throughout, a thin film of plastic material on the periphery of said shaft, the external surface thereof conforming substantially to the irregular surface contour of said shaft, and the adjacent, spaced bearing surface of said bearing member being substantially smooth, whereby, upon rotation of said shaft in said bearing, a turbulent gas film is caused to act as a lubricating medium.

8. A self-acting bearing assembly, comprising a shaft and a bearing member having an annular clearance to accommodate a gas film cushion, the peripheral surface of said shaft being provided with randomly distributed irregularities throughout, a thin coating of plastic material on the perpihery of said shaft, the external surface thereof conforming substantially to the irregular surface contour of said shaft, defining in said external surface a series of gas pockets, and the adjacent, spaced bearing surface of said bearing member being substantially smooth, whereby, upon rotation of said shaft in said bearing, a turbulent gas film is caused to act as a lubricating medium.

References Cited in the file of this patent

UNITED STATES PATENTS

| | | |
|---|---|---|
| 1,980,081 | Ovington | Nov. 6, 1934 |
| 2,145,460 | Ryder | Jan. 31, 1939 |
| 2,187,348 | Hodson | Jan. 16, 1940 |
| 2,696,410 | Topanelian | Dec. 7, 1954 |
| 2,899,243 | Acterman | Aug. 11, 1959 |
| 2,932,081 | Witte | Apr. 12, 1960 |
| 2,983,832 | Macks | May 9, 1961 |
| 3,047,934 | Magner | Aug. 7, 1962 |